US010798862B2

(12) United States Patent
Hardman et al.

(10) Patent No.: US 10,798,862 B2
(45) Date of Patent: Oct. 13, 2020

(54) GROUND TREATMENT APPARATUS

(71) Applicant: Novokraft AG, Itingen (CH)

(72) Inventors: Eric Hardman, Riehen (CH); Benjamin Buehrer, Lieli (CH)

(73) Assignee: NOVOKRAFT AG, Itingen (CH)

( * ) Notice: Subject to any disclaimer, the term of this patent is extended or adjusted under 35 U.S.C. 154(b) by 118 days.

(21) Appl. No.: 16/136,250

(22) Filed: Sep. 20, 2018

(65) Prior Publication Data

US 2019/0014713 A1 Jan. 17, 2019

Related U.S. Application Data

(63) Continuation of application No. PCT/EP2017/052964, filed on Feb. 10, 2017.

(30) Foreign Application Priority Data

Mar. 21, 2016 (DE) ........................ 10 2016 105 248

(51) Int. Cl.

*A01B 45/02* (2006.01)
*A01B 63/00* (2006.01)
*A01B 69/00* (2006.01)
*A01B 76/00* (2006.01)

(52) U.S. Cl.

CPC ............ *A01B 45/02* (2013.01); *A01B 45/023* (2013.01); *A01B 63/008* (2013.01); *A01B 69/00* (2013.01); *A01B 76/00* (2013.01)

(58) Field of Classification Search

CPC ....... A01B 45/02; A01B 45/00; A01B 45/023; A01B 63/008; A01B 63/002; A01B 63/00; A01B 69/00; A01B 76/00

See application file for complete search history.

(56) References Cited

U.S. PATENT DOCUMENTS

| | | | |
|---|---|---|---|
| 258,432 | A | 5/1882 | Keith |
| 2,584,322 | A | 2/1952 | Baldwin et al. |
| 2,789,522 | A | 4/1957 | Barton |
| 4,034,686 | A | 7/1977 | Collins |
| 4,624,194 | A | 11/1986 | Zinck |
| 4,658,738 | A | 4/1987 | Zinck |
| 5,054,831 | A | 10/1991 | Ting et al. |
| 5,101,745 | A | 4/1992 | Podevels et al. |

(Continued)

FOREIGN PATENT DOCUMENTS

| | | |
|---|---|---|
| CA | 2 808 763 A1 | 1/2014 |
| DE | 40 28 996 A1 | 3/1992 |

(Continued)

*Primary Examiner* — Christopher J. Novosad

(74) *Attorney, Agent, or Firm* — Aslan Law, P.C.

(57) ABSTRACT

A ground treatment apparatus including a holding device held on a support device, a plurality of injection elements disposed on the holding device, a fluid providing device in fluidic connection with the plurality of injection elements, a lifting device for inserting the plurality of injection elements into the ground and to extract the plurality of injection elements from the ground, a plurality of fluid containers in fluidic connection with the fluid providing device for the supply of fluid and a valve device having a plurality of outlet valves. The apparatus further including preassembled injection units, a respective injection unit comprising a fluid container, an outlet valve and an injection element.

25 Claims, 6 Drawing Sheets

(56) References Cited

U.S. PATENT DOCUMENTS

| | | | |
|---|---|---|---|
| 5,178,078 | A | 1/1993 | Pendergras |
| 5,802,996 | A | 9/1998 | Baxter |
| 5,988,291 | A | 11/1999 | Yeomans |
| 6,431,096 | B1 | 8/2002 | Engelke et al. |
| 7,100,800 | B2 * | 9/2006 | Yakasovic Saavedra .................... F17C 5/00 222/3 |
| 2006/0070748 | A1 | 4/2006 | Faltysek |
| 2015/0216102 | A1 | 8/2015 | Georgoulias et al. |

FOREIGN PATENT DOCUMENTS

| | | | |
|---|---|---|---|
| DE | 10 2015 201 091 | A1 | 8/2015 |
| DE | 10 2014 105 577 | A1 | 10/2015 |
| DE | 10 2015 110 547 | A1 | 1/2017 |
| DE | 10 2015 115 991 | A1 | 3/2017 |
| EP | 1 203 522 | A1 | 5/2002 |
| GB | 2 472 229 | A | 2/2011 |
| JP | S55-77909 | U | 5/1980 |
| JP | H10-191737 | A | 7/1998 |
| JP | 2011-030545 | A | 2/2011 |
| RU | 2 031 563 | C1 | 3/1995 |
| RU | 2 138 935 | C1 | 10/1999 |
| SU | 493202 | A1 | 11/1975 |
| SU | 686656 | A1 | 9/1979 |
| WO | WO 02/074058 | A1 | 9/2002 |

* cited by examiner

FIG.7
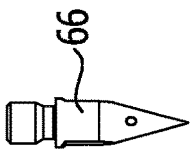
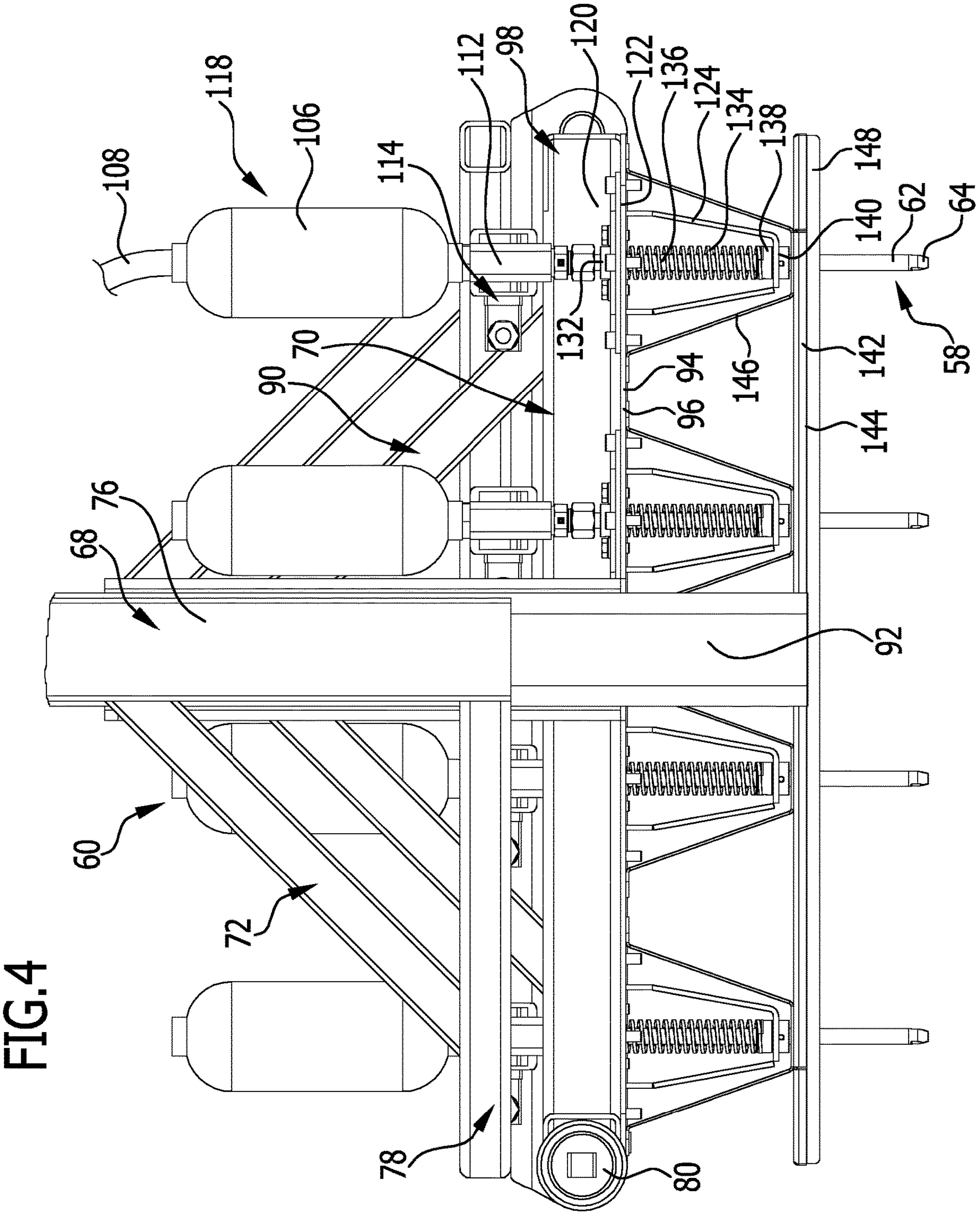
FIG.4

GROUND TREATMENT APPARATUS

CROSS-REFERENCE TO RELATED APPLICATIONS

This application is a continuation patent application of international application number PCT/EP2017/052964, filed on Feb. 10, 2017, and claims the benefit of German application number 10 2016 105 248.5, filed Mar. 21, 2016, which are incorporated herein by reference in their entirety and for all purposes.

FIELD OF THE INVENTION

The present invention relates to a ground treatment apparatus for loosening ground, in particular in the case of ground with grass growth, specifically ground of sport or leisure facilities, comprising a support device and a holding device held thereon having a plurality of injection elements, a fluid providing device which is in fluidic connection with the injection elements, as well as a lifting device by way of which the injection elements are insertable into the ground and are extractable therefrom.

BACKGROUND OF THE INVENTION

A ground treatment apparatus of that kind is described, for example, in the not previously published patent application DE 10 2015 115 991 of the same Applicant. Said patent application is incorporated by reference in its entirety into the present application. The ground treatment apparatus is used for the management of the ground. The, for example needle-shaped, injection elements serve to inject a fluid into the ground. Through the action of the fluid, in particular a compressed gas or compressed gas mixture, specifically compressed air (airification is referred to in this case), a loosening and thereby a better aeration and irrigation of the ground is achieved. Air and water can better penetrate into the ground and the effect of drainage is improved. In the case of ground with grass growth, e.g. of grounds of sport or leisure facilities, the root system can better spread in the soil in order to stimulate growth.

Stimulating the growth of grass through improved aeration, irrigation, and loosening of the ground is desirable in particular when pipe conduits of a grass conditioning device are installed in the ground. A grass conditioning device of that kind is provided e.g. for a sport or leisure facility and, in an advantageous embodiment, is installed near the surface. The near-surface installation allows for a high energy efficiency of the grass conditioning device which may be configured as a grass heating device and/or as a grass cooling device. Due to the temperature fluctuation, for example resulting from a heating in the case of a grass heater, there is a particular need for ground maintenance that stimulates the growth of grass. Apparatuses for the near-surface installation of pipes for grass conditioning devices are described e.g. in DE 10 2014 105 577 A1 and in the not previously published patent application DE 10 2015 110 547 of the same Applicant.

The present invention is described below in particular using the example of the use with a sport or leisure facility having grass growth, which specifically is equipped with a grass conditioning device which has pipe conduits installed in the ground near the surface. However, the present invention is not restricted only to this area of application, even though it is particularly suitable therefor. The ground loosening by means of a fluid injected into the ground proves to be advantageous also for ground without a grass conditioning device. Exemplary uses of the present invention are in the case of a soccer field including its bordering regions (sides and outer goal areas, coaching zones . . . ), a football field, a baseball field, a golf course, which may comprise both the green and the fairway, or a tennis court with grass growth. Examples of leisure facilities are green areas in the public domain, such as park facilities.

The conventional ground treatment apparatus may be moved over the ground surface in a self-propelled manner or by means of a traction vehicle. The injection elements are lowered by means of the lifting device until they engage into the ground. “Lifting device” therefore includes the lowering of the injection elements. A fluid is injected by way of the injection elements for loosening the ground, whereupon the injection elements may again be extracted from the ground by means of the lifting device.

In particular the ground treatment apparatus described in DE 10 2015 115 991 proves itself in practice. Nevertheless, it would be desirable to provide a ground treatment apparatus with which an even more effective loosening of the ground may be achieved.

An object underlying the present invention is to provide a ground treatment apparatus of the kind stated at the outset, which enables a better loosening of the ground.

SUMMARY OF THE INVENTION

In a first aspect of the invention, a ground treatment apparatus for loosening ground, in particular in the case of ground with grass growth, specifically ground of sport or leisure facilities, comprises a support device and a holding device held thereon having a plurality of injection elements, a fluid providing device which is in fluidic connection with the injection elements, as well as a lifting device by way of which the injection elements are insertible into the ground and are extractable therefrom. The ground treatment apparatus further comprises a plurality of fluid containers which are in fluidic connection with the fluid providing device for acting with fluid, a valve device having a plurality of outlet valves, wherein each fluid container is in a fluidic connection with at least one injection element, which fluidic connection is optionally releasable or blockable by means of a respective outlet valve. The ground treatment apparatus comprises a control device which controls the outlet valves to release the respective fluidic connection when the injection elements are inserted into the ground.

BRIEF DESCRIPTION OF THE DRAWINGS

The foregoing summary and the following description may be better understood in conjunction with the drawing figures, of which:

FIG. 4: shows a side view of the holding device in the viewing direction of the arrow “4” in FIG. 3, while hiding some components;

FIG. 7: shows a side view of a nozzle of an injection element of the ground treatment apparatus.

DETAILED DESCRIPTION OF PREFERRED EMBODIMENTS OF THE INVENTION

Figure 1:
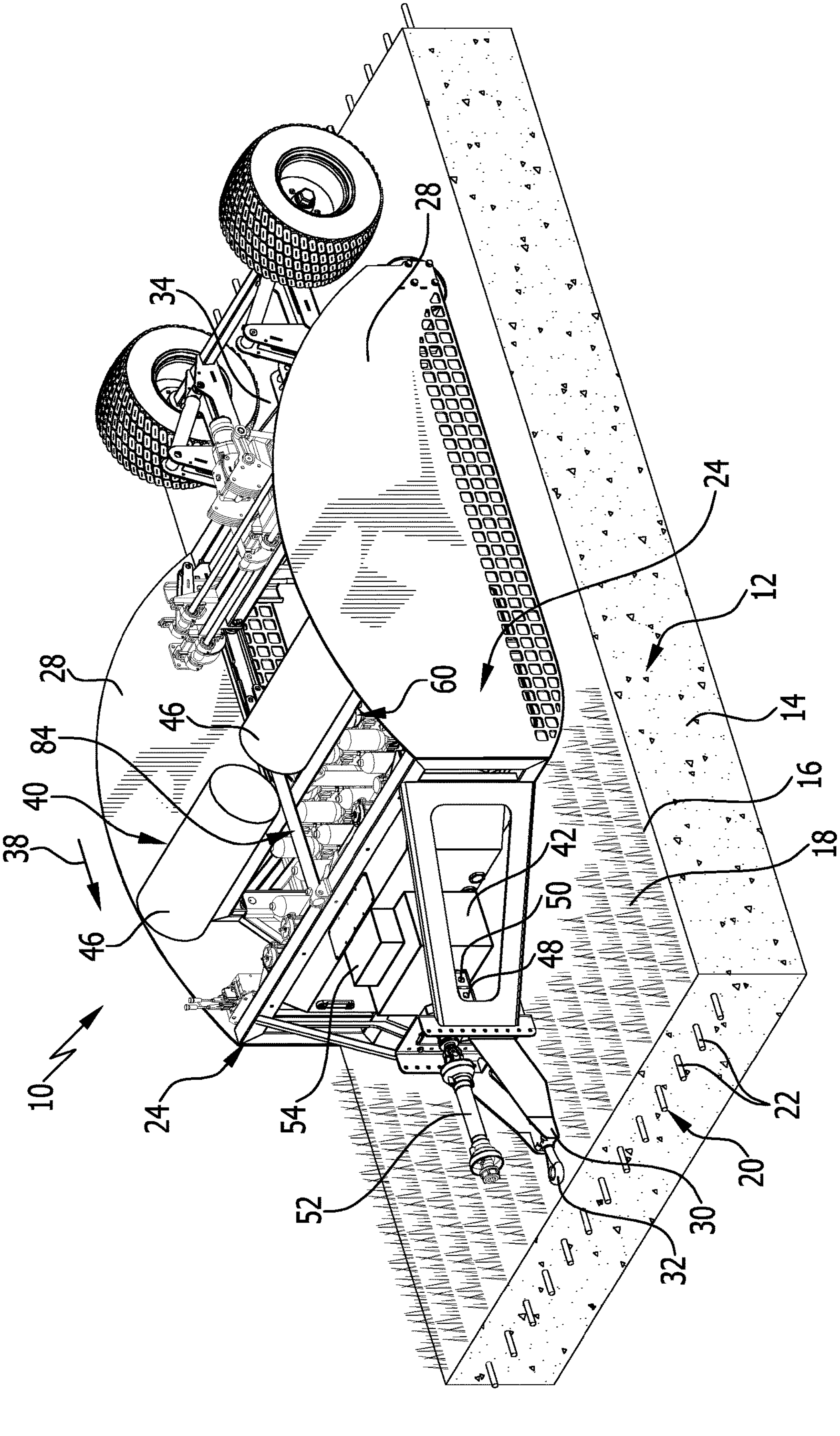
FIG. 1: shows a perspective illustration of a ground treatment apparatus in accordance with the invention.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a ground treatment apparatus for loosening ground, in particular in the case of ground with grass growth, specifically ground of sport or leisure facilities, comprising a support device and a holding device held thereon having a plurality of injection elements, a fluid providing device which is in fluidic connection with the injection elements, as well as a lifting device by way of which the injection elements are insertible into the ground and are extractable therefrom. The ground treatment apparatus comprises a plurality of fluid containers which are in fluidic connection with the fluid providing device for acting with fluid, a valve device having a plurality of outlet valves, wherein each fluid container is in a fluidic connection with at least one injection element, which fluidic connection is optionally releasable or blockable by means of a respective outlet valve. The ground treatment apparatus comprises a control device which controls the outlet valves to release the respective fluidic connection when the injection elements are inserted into the ground.

In the ground treatment apparatus in accordance with the invention, provision is made for a plurality of fluid containers to be used in which fluid is stored prior to the injection into the ground. Associated with each fluid container is at least one injection element with which the fluid container is in an optionally releasable or blockable fluidic connection. When the lifting device is lowered and the injection elements engage into the ground, the control device may control the outlet valves to release the fluidic connection. Fluid may then be injected into the ground for the loosening thereof. The use of a plurality of fluid containers proves in practice to be advantageous. The requirements for pipework for connecting the injection elements to a plurality of fluid containers can be reduced in comparison to the conventional ground treatment apparatus with only one reservoir. It shows in practice that the pressure buildup in the injection elements and thus in the ground upon opening the outlet valves is improved and in particular accelerated by providing a plurality of fluid containers.

"Outlet valve" is presently to be understood in particular to the effect of fluid being able to flow out of the fluid container via the fluidic connection to the at least one injection element when the outlet valve is opened. It is not necessary, but nonetheless possible, for the respective outlet valve to be arranged directly on an outlet of the fluid container or to be positioned in its immediate vicinity.

Position and orientation indications like e.g. "above", "below" or the like are presently to be interpreted as relating to a use state of the ground treatment apparatus. The ground treatment apparatus thereby adopts in particular a use position on the ground surface. The ground treatment apparatus is preferably moved in a working direction or primary movement direction, such that the ground may be loosened at successive treatment regions by way of the repeatedly raised and lowered injection elements.

A respective fluid container is advantageously in fluidic connection with at most five injection elements, preferably with at most three injection elements. For example, with a respective fluid container may be associated at most five or at most three injection elements, which are acted upon with fluid via the fluidic connection by the fluid container with opened outlet valve.

In a particularly advantageous embodiment of the ground treatment apparatus in accordance with the invention, a respective fluid container is in fluidic connection with exactly one injection element. Correspondingly, provision may be made for exactly one injection element to be associated with a respective fluid container, with which injection element the fluid container is in fluidic connection, wherein the same may be optionally released and blocked by means of a respective outlet valve. Each fluid container acts upon only one injection element, whereby e.g. a compact structural shape of the fluid container, the outlet valve, and the injection element may be produced as subsequently explained. This promotes the effectiveness of the fluid injection for a better loosening of the ground.

In particular, a fluid container is advantageously associated with each injection element of the ground treatment apparatus for acting upon with fluid.

The injection elements advantageously are or comprise pipe conduits with nozzles arranged on the ends. A respective injection element favorably has a rigid, linearly extended pipe conduit on which a nozzle is arranged on the end.

A respective nozzle of an injection element may be rounded; nozzles of that kind are used e.g. for natural grass and rolled turf. On the other hand, it is conceivable for a respective nozzle to be of pointed and thorn-shaped configuration. Nozzles of that kind may be used in particular for treating ground having so-called "hybrid grass", which combines artificial turf and natural grass.

A respective nozzle may comprise one or a plurality of exit openings. It proves in practice to be advantageous if at least one non-axial exit opening is provided, in relation to a direction of the injection element. For example, a plurality of non-axial exit openings is provided in order to produce a "fluid cloud" in the ground in the vicinity of the nozzle.

It proves to be advantageous if a respective fluid container is connected in linear direction to a nozzle at the exit of the respective at least one injection element and in particular exactly one injection element. Commencing from the fluid container, the fluid may flow linearly up to the nozzle of the at least one injection element. The fluidic connection is in particular free of redirections via the flow connection from the fluid container to the at least one injection element. It is found that a quick pressure buildup at the nozzle for injecting fluid into the ground in a short amount of time and effectively is possible as a result.

A respective outlet valve favorably has a valve housing to the entry site of which the respective fluid container is connected, wherein the respective at least one injection element is connected to an exit side of the valve housing. By way of the valve housing, the fluid container may be in direct and immediate fluidic connection with the at least one and preferably only one injection element. This facilitates a compact structural shape, wherein an injection unit of fluid container, outlet valve, and (at least one) injection element may favorably be provided. The fluid container, the outlet valve, and the at least one and in particular exactly one injection element are preferably rigidly connected to each other. This avoids moved sealing faces of the at least one injection element and the fluid container at the outlet valve, such that an effectively sealed fluidic connection from the fluid container to the nozzle may be provided.

It is advantageous if the ground treatment apparatus is free of hose conduits for connecting a respective fluid container to the respective at least one injection element. It is shown in practice that avoiding hose conduits is beneficial to the fluid injection into the ground. Instead, at most, rigid fluid conduits are used, wherein a direct connection of the fluid container to the at least one injection element, e.g. as described above via a valve housing of the outlet valve, is advantageous, which forms a rigid fluid conduit.

It is favorable if the ground treatment apparatus has preassembled injection units which each comprise or are formed by a fluid container, an outlet valve, and the at least one injection element associated with the fluid container. The injection units preferably comprise a fluid container, an outlet valve, and the at least one and favorably exactly one injection element in rigid connection with each other. The injection units may be attached preassembled on the holding device upon the assembly of the ground treatment apparatus. In this case, it is favorable if the injection units are detachably connectable to the holding device. A defective injection unit may be removed from the holding device and replaced by a further, functioning injection unit or may be attached again on the holding device after repair.

The fluid providing device advantageously has at least one reservoir and preferably two reservoirs as well as a conveying assembly for conveying fluid into the at least one reservoir, wherein the at least one reservoir is in fluidic connection with the fluid containers by way of at least one filling conduit and the valve device comprises at least one filling valve with which the at least one filling conduit is optionally releasable and blockable. By means of the conveying assembly, fluid may be conveyed into the at least one reservoir. The conveying assembly is thereby preferably oversized for the necessary amount of fluid to be injected. Possible excess of fluid, specifically when using a gas or gas mixture, may escape or be released unused. The at least one reservoir may be used for storing fluid for later provision to the fluid containers. This offers the possibility, for example, of being able to compensate possible fluctuations in the amount of fluid provided during pulsing, cyclic, or periodic operation of the conveying assembly. Fluid may be supplied to the fluid containers via the at least one filling conduit when the filling valve is released.

The at least one filling conduit is, for example, connected to an entry side of the respective fluid container, which lies opposite an exit side thereof. The respective outlet valve is preferably connected to the exit side.

The fluid containers of the ground treatment apparatus in accordance with the invention may be regarded as fluid buffers or "fluid locks". The fluid reserved in the at least one reservoir flows via the at least one filling conduit into the fluid containers and may be temporarily stored therein. For injection into the ground, the outlet valves are opened and the fluid is delivered via the injection elements.

It is advantageous if the at least one filling valve is controllable by the control device, wherein the control device controls the at least one filling valve to block the at least one filling conduit when the outlet valves release the fluidic connection from the fluid containers to the injection elements, and if the control device controls the at least one filling valve to at least temporarily release the at least one filling conduit and act upon the fluid container with fluid when the outlet valves block the fluidic connection from the fluid containers to the injection elements. After the fluid injection, the control device may switch the outlet valves into a blocking state. The filling valves may be switched into a release state for releasing the at least one filling conduit, so that fluid is able to flow out of the at least one reservoir into the fluid containers and fill the latter.

The conveying assembly may be in fluidic connection with the at least one reservoir, for example by way of at least one supply conduit.

The conveying assembly is e.g. a compressed air compressor, if the fluid used is compressed air.

The conveying assembly may be operated by means of a drive. For example, a hydraulic, mechanical, or electrical drive is provided.

The fluid may be a gas or gas mixture, in particular compressed air. When compressed air is used, the ground is airified.

Alternatively or in addition, provision may be made for the fluid to be or comprise a liquid.

It is advantageous if the holding device has a coupling part and a holding part, wherein the holding device is held on the support device by the coupling part and is thereby coupled therewith, and the injection elements are held on the holding part.

The ground treatment apparatus favorably comprises an adjustment device, by way of which the coupling part is moveable relative to the support device along a working direction of the ground treatment apparatus. The adjustment device, for example a displacement device, enables the movement of the holding device by way of its coupling part relative to the support device. This allows in particular for ensuring a quasi-continuous functioning of the ground treatment apparatus, as is described for example in the patent application DE 10 2015 115 991 stated at the outset and incorporated herein. In that case, the ground treatment apparatus may be moved on the ground surface with preferably constant speed. The holding device may remain stationary on the ground during the fluid injection by the support device moving relative to the holding device. Then, the injection elements may be raised and the holding device moved in the working direction faster than the support device, whereupon the injection elements are lowered and once again inserted into the ground. This makes it possible to act upon successive consecutive treatment regions of the ground with fluid and to process the ground surface in full-coverage mode.

The adjustment device favorably has a guide for the holding device on the support device.

It is favorable if the holding part is raisable and lowerable relative to the coupling part by way of the lifting device. The lifting device may be a constituent of the holding device. A guide for the holding part with the injection elements held thereon is favorably arranged on the coupling part.

The holding part may advantageously be lowered and raised perpendicularly by way of the lifting device.

The lifting device is advantageously configured as a displacement device.

It is understood that the adjustment device and the lifting device are advantageously controllably by the control device.

In an implementation of the ground treatment apparatus, it proves in practice to be advantageous if the adjustment device and/or the lifting device are of hydraulic configuration and if the ground treatment apparatus has a hydraulic pump for providing hydraulic liquid for the adjustment device and/or the lifting device.

Alternatively, provision may be made for the adjustment device and/or the lifting device to be of pneumatic, mechanical, or electrical configuration.

The adjustment device and the lifting device favorably each comprise at least one piston-cylinder-assembly which may be extended or retracted using hydraulic actuation in order to move the holding device or the holding part.

The holding device, in particular the holding part, advantageously has a holding body on which the injection elements are fixed by means of fixing parts. Provision may hereby be made in particular for a fixing part to be associated with a respective injection element. The holding body is in particular a constituent of the holding part and may be lowered by means of the lifting device for inserting the injection elements into the ground and be raised for extracting the injection elements, respectively. For maintenance purposes, for example, it is advantageous if the outlet valves and the fluid containers are arranged above the holding body. It may hereby be understood, for example, that the outlet valves and the fluid containers are arranged on a side of the holding body remote from the ground surface.

For a robust and compact structure, it proves to be advantageous if the injection elements pass through through-openings of the holding body (e.g. perforations), wherein a respective injection element is fixed with a fixing part on a rim of a respective through-opening. The fixing part is, for example, fixed on the rim of the through-opening in a flange-like manner and is connected to the holding body, favorably by way of releasable screw connection. The injection element may project beyond the holding body and the fixing part in the direction of the ground.

It is favorable if the injection elements are displaceable relative to the holding body counter to the restoring force of restoring elements acting upon them away from the holding body, wherein the fixing parts form a guide for the injection elements. For example when an injection element experiences an excessive resistance upon insertion into the ground—here it is possible that a rock or a pipe conduit of a grass conditioning device is struck—the injection element can be displaced relative to the holding body counter to the force of the restoring element and thereby be protected against damage.

In the last-mentioned advantageous embodiment, a respective fluid container is preferably rigidly connected to an outlet valve and the at least one injection element associated therewith, wherein the fluid container and the outlet valve are displaceable together with the at least one injection element. Upon displacement of the injection element, the outlet valve and the fluid container are preferably also displaced, such that an association of only one injection element with a fluid container has a particular advantage. The respective other injection elements may remain unmoved when an injection element is displaced. Possible moved sealing faces may be avoided by way of a rigid connection of the fluid container to the injection element by way of the outlet valve. Also, flexible hose conduits for the fluidic connections may be dispensed with.

The restoring element may be a biasing element which biases the injection element with a force directed to the ground. For example, the restoring element is supported on a respective shoulder on the injection element and on the fixing part.

The above-mentioned injection units advantageously comprise a fixing part which is provided preassembled on the injection unit in order to facilitate assembly of the ground treatment apparatus.

The ground treatment apparatus advantageously has at least one abutment body for abutment on the ground surface, wherein a respective injection element passes through an abutment body, and wherein the at least one abutment body comprises at least one sealing element or such a sealing element is arranged on the abutment body, which encloses the respective injection element. When the injection elements engage into the ground, the holding device may be supported on the ground by the at least one abutment body. The ground surface may thereby be acted upon with a force, such that formations of unevenness on the ground surface may be avoided. The at least one sealing element may enclose at least one injection element in order to prevent the fluid from undesirably exiting between the at least one abutment body and the ground surface, and instead remains in the ground.

An advantageous embodiment of the ground treatment apparatus has an abutment body through which all injection elements pass, as well as a sealing element which encloses all injection elements. The holding device may be supported on the ground surface over an area by way of the abutment body, and the one sealing element seals between the ground surface and the abutment body.

The sealing element is preferably a compressible or squishable sealing bead.

The at least one abutment body is advantageously positioned at a distance from the holding body of the holding device and is supported on the holding body by supporting parts, wherein the injection elements pass through an interspace between the at least one abutment body and the holding body. The interspace enables e.g. the accommodation of the previously mentioned restoring elements and of guides which are formed by the fixing parts for the injection elements.

It may prove to be advantageous if the injection elements are raisable by means of the lifting device after insertion into the ground and before the fluid injection, in order to form a free space beneath the injection elements in the ground. The injection elements may remain stationary at the treatment region, with respect to the working direction of the ground treatment apparatus, during the engagement into the ground. This does not rule out that they may be raised with the at least one drive device after the insertion into ground and before the fluid injection. For example, the injection elements are raised slightly by about 0.3 cm to 0.8 cm. It shows in practice that a better effect of loosening the ground may be achieved due to the free space produced.

In the latter case, provision may be made for the at least one abutment body to be raised somewhat from the ground surface after lowering the holding device and initially resting on the ground surface. The at least one sealing element may also in this case ensure a sealing between the ground surface and the abutment body.

It proves to be favorable if the holding body and/or the at least one abutment body are of plate-shaped configuration at least in regions and preferably entirely.

For an advantageous and reliable loosening of the ground, in particular in the case of airification of sport facilities like soccer fields, it proves to be advantageous if the control device controls the outlet valves according to at least one of the following:

- executing only one fluid pulse through the injection elements;
- releasing the fluidic connection for about 0.05 s to 0.5 s, preferably about 0.1 s to about 0.2 s.

The respective fluid container is preferably not emptied, but rather a residual amount of fluid remains, favorably with over-pressure in relation to the ambient pressure.

The fluid containers favorably have a volume of about 0.25 L to 2 L, preferably of about 0.5 L to 1.5 L. For the use of the ground treatment apparatus on a sport facility like a soccer field, a volume of the fluid containers of about 1 L has proven to be particularly advantageous.

The fluid providing device is favorably configured in such a way that a fluid pressure of about 5 bar to 10 bar in the fluid containers is providable, preferably about 7 bar to 8 bar. The injection pressure is as great, for example.

In relation to the outer pressure in the ground, the amount of injected fluid, in particular compressed air, may be 2 L to 4 L, for example.

An advantageous embodiment of the ground treatment apparatus in accordance with the invention has injection elements positioned according to a regular pattern. For example, the injection elements define a hexagonal pattern and are arranged on the holding device in rows, each with a plurality of injection elements positioned laterally side by side, wherein adjacent rows have injection elements with a gap therebetween. For example, four rows are present with six/seven/six/seven in each case laterally side by side injection elements.

The spacing of injection elements to each other may be e.g. about 15 cm to 50 cm and typically about 25 cm.

The insertion depth of the injection elements into the ground is preferably adjustable and variable.

As mentioned at the outset, the ground treatment apparatus may comprise a coupling device for connecting to a traction vehicle. At least one drive of the ground treatment apparatus may be drivable by way of the traction vehicle. For example, a hydraulic pump of the ground treatment apparatus is driven by way of a power take-off shaft drivable by the traction vehicle.

Alternatively or in addition, provision may be made for the ground treatment apparatus to be configured to be self-propelled and self-steering. The ground treatment apparatus may have a chassis with a travel drive, which is controllable by the control device, such that the ground may be autonomously processed.

Figure 2:
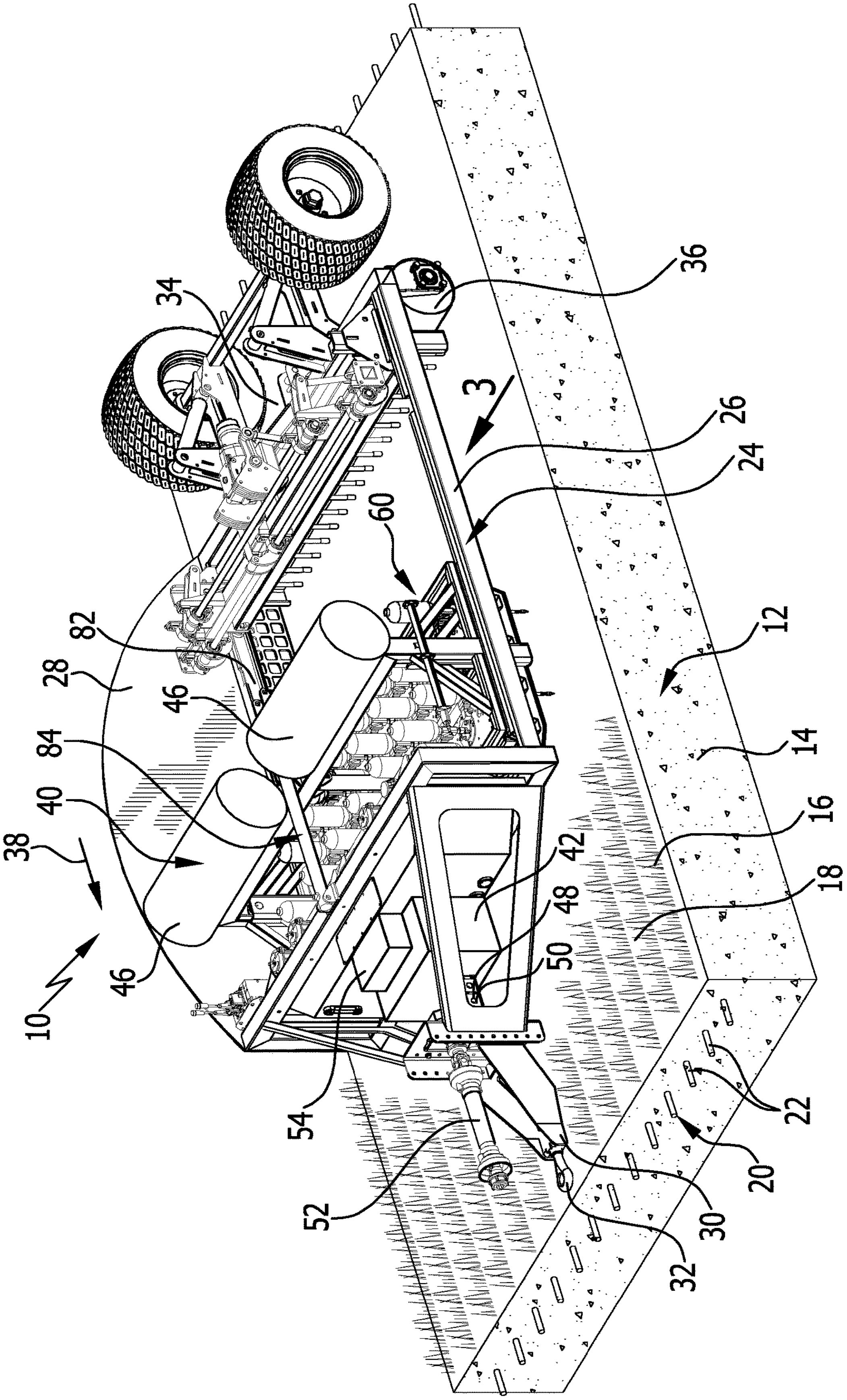
FIG. 2: shows an illustration corresponding to FIG. 1, wherein a side wall of the ground treatment apparatus is hidden.

FIGS. 1 and 2 show a perspective depiction of an advantageous embodiment, attributed with the reference numeral 10, of a ground treatment apparatus in accordance with the invention, subsequently referred to as apparatus 10 for simplicity.

Further, a ground 12 to be treated by the apparatus 10 is depicted, to which soil 14 and a ground surface 16 covering the latter belong. The ground 12 has grass growth 18. The ground 12 is concerning, for example, the ground of a sport or leisure facility, in particular a soccer field. Correspondingly, the lawn growth 18 may be rolled turf, though a use of the apparatus 10 with hybrid grass is also conceivable.

In the ground 12 is installed a grass conditioning device 20 which comprises a plurality of pipe conduits 22. The pipe conduits 22 are preferably installed near the surface and e.g. by using an apparatus, as they are described in DE 10 2014 105 577 A1 or in the not previously published DE 10 2015 110 547. The grass conditioning device 20 is in particular a grass heating device, such that the pipe conduits 22 heat up during operation. This may lead to the ground 12 drying out.

The apparatus 10 is provided for maintenance of the ground 12 and for stimulating the grass growth 18, with which apparatus 10 an advantageous loosening of ground, an improved ground aeration, irrigation, and effect of drainage may be achieved. As a result, the root system of the grass growth 18 can better spread in the ground 12 for stimulating the growth.

Reference is made to the fact that the present invention is not restricted to the use on ground of the described kind, this serves only for better description of the invention.

The apparatus 10 comprises a support device 24 which has a support frame 26. The support frame 26 is formed, for example, out of longitudinal and transverse supports connected to each other and/or further components. Presently, the support device 24 also comprises side walls 28, of which a left side wall 28 is hidden in FIG. 2.

At a front side 30, on the support device 24 is arranged a coupling device 32 by way of which the apparatus 10 may be coupled to a traction vehicle not depicted in the illustration. Near or on a rear side 34, a bearing element, presently in the form of a roller 36, is held on the support frame 26. The apparatus 10 may rest on the ground surface 16 by way of the roller 36.

Position and orientation indications like "front side", "rear side", "upper", "lower" or the like are presently to be interpreted in relation to a use state of the apparatus 10. In that case, the apparatus 10 rests with the roller 36 on the ground surface 16 and with the coupling device on the traction vehicle and may be moved over the ground 12 in a working direction 38. The latter coincides with a longitudinal direction of the apparatus 10.

A fluid is used in the apparatus 10 for loosening the ground 12, wherein it is presently concerning a gas or gas mixture and in particular compressed air. The apparatus 10 is therefore an airification apparatus.

The apparatus 10 comprises a fluid providing device 40 for providing compressed air. The fluid providing device 40 has a conveying assembly 42, presently an air compressor. Ambient air is compressed and supplied via a respective supply conduit 44 to reservoirs 46 of the fluid providing device 40. Presently, two reservoirs 46 and two supply conduits 44 are provided, wherein the schematic circuit diagram of FIG. 6 only shows one reservoir 46; the reservoirs 46 are hidden in FIG. 3.

The conveying assembly 42 is driven by means of a drive 48 (e.g. by flange-mounting) which presently has a hydraulic pump 50. The drive 48 in turn is driven by means of a shaft 52. The shaft 52 is a power take-off shaft which may be driven by the traction vehicle. The hydraulic pump 50 is preferably controllable in its operation point by a control device 54 of the apparatus 10 via a control line 56.

Figure 3:
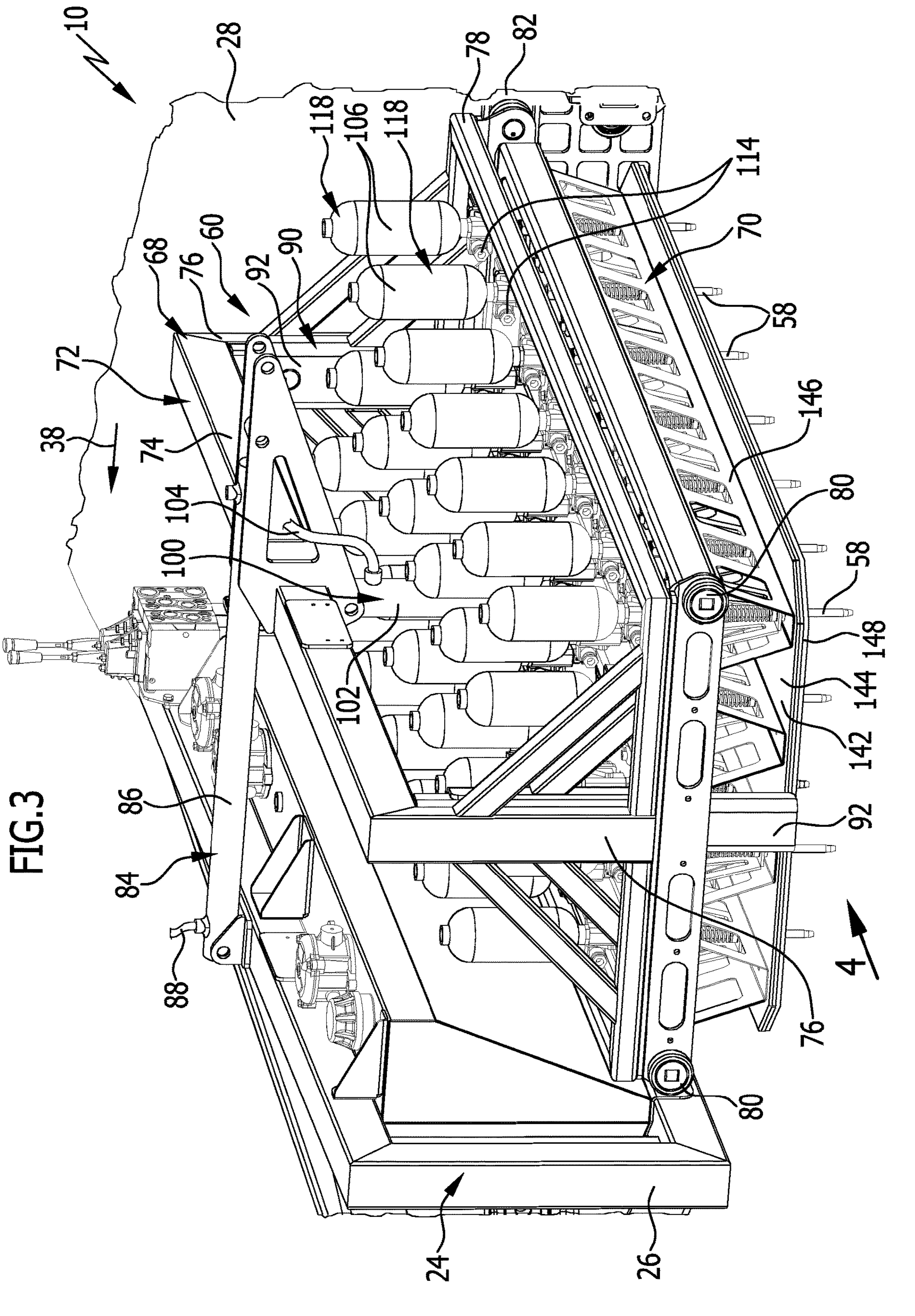
FIG. 3: shows an enlarged perspective partial illustration of the ground treatment apparatus in the viewing direction of the arrow “3” in FIG. 2, wherein a holding device with fluid containers, outlet valves, and injection elements is depicted.
Figure 5:
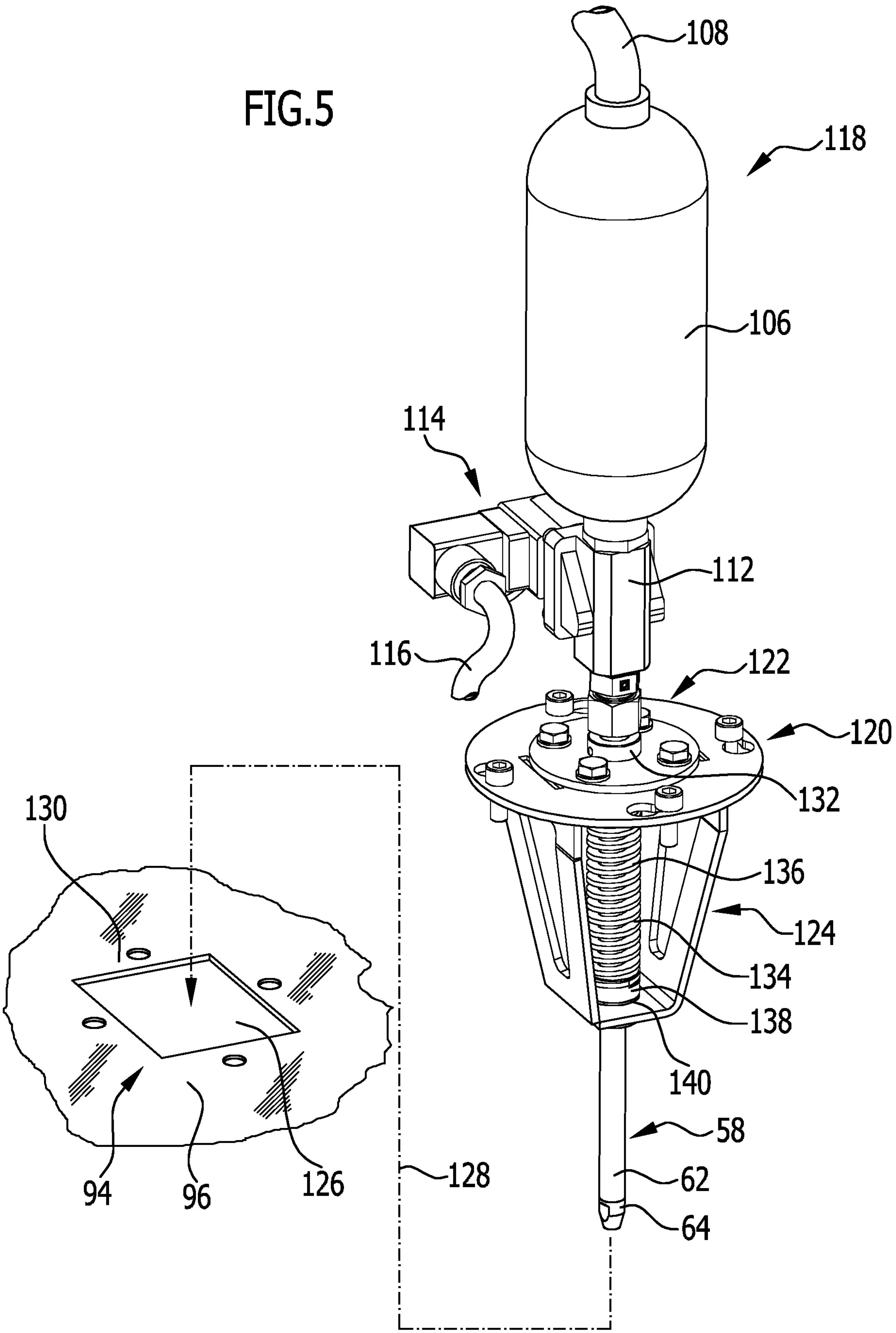
FIG. 5: shows a perspective illustration of an injection unit of the ground treatment apparatus with a fluid container, an outlet valve, an injection element, and a fixing part as well as a schematic partial illustration of a holding body.

For injecting compressed air into the ground 12, the apparatus 10 comprises a plurality of injection elements 58 which are held on a holding device 60 of the apparatus 10 in a manner described below. The injection elements 58 each comprise a rigid and linearly extended pipe conduit 62 as well as a nozzle 64 arranged thereon on the end. While FIGS. 3 to 5 show rounded nozzles 64, FIG. 7 depicts an alternatively useable nozzle 66. The rounded nozzles 64 are typically used in the case of rolled turf or natural grass. In contrast, the nozzles 66 may advantageously be used with hybrid grass.

The holding device 60 has a coupling part 68 for mounting to the support device, as well as a holding part 70 for mounting the injection elements 58. As is clear in particular from FIGS. 2 and 3, the coupling part 68 comprises or forms a frame 72 with an upper transverse support 74 and vertical supports 76. A horizontal frame 78 constructed from longitudinal and transverse supports is held on the vertical supports 76. Guide members in the form of wheels 80 may engage in guides 82 formed by the support frame 26, namely its two longitudinal supports.

Orientation indications like e.g. "horizontal" and "vertical" are to be regarded as an alignment and adjustment of the apparatus 10 in such a way that, with a ground surface 16 taken to be horizontal, a horizontal alignment of the longitudinal and transverse supports of the support frame 26 and thus a vertical alignment of the injection elements 58 is produced.

The apparatus 10 comprises an adjustment device 84, presently configured as a displacement device, in order to displace the holding device 60 along the working direction 38. To this end, the adjustment device 84 has a piston-cylinder-assembly 86 which presently engages on the support frame 26 and on the upper transverse support 74. A hydraulic liquid may be supplied via a hydraulic conduit 88 to the piston-cylinder-assembly 86 by means of the hydraulic pump 50, or said liquid may be removed from the piston-cylinder-assembly 86. By way of a length change of the piston-cylinder-assembly 86, the holding device 60 may be displaced relative to the support device 24 by way of the coupling part 68 on whose frame the force engages. The holding part 70 is thereby also displaced with the injection elements 58 held thereon.

The adjustment device 84 may be controlled by the control device 54. The holding part 70 has a frame 90 which is enclosed by the frame 72 of the coupling part 68 and is held thereon so as to be height-adjustable. The frame 90 comprises vertical supports 92 which are displaceable on the vertical supports 76 by way of rollers which are not depicted in the illustration, wherein said rollers form a guide for the vertical supports 92. The frame 90 further comprises a holding body 94 fixed on the vertical supports 92. The holding body 94 is presently of largely plate-shaped configuration with a plate 96 which is laterally surrounded by the horizontal frame 78 of the coupling part 68.

The apparatus 10 comprises a lifting device 100 which is configured as a displacement device and comprises a piston-cylinder-assembly 102. The piston-cylinder-assembly 102 engages on the coupling part 68 by way of the upper transverse support 74 and on the holding part 70 by way of the holding body 94. Hydraulic liquid may be supplied via a hydraulic conduit 104 to the piston-cylinder-assembly 102 or be removed therefrom. The hydraulic pump 50 serves as a drive for this purpose, wherein the lifting device 100 too is controllable by the control device 54. By way of a length change of the piston-cylinder-assembly 102, the holding body 94 and hence the holding part 70 may be raised and lowered. As a result, the injection elements 58 may also be raised and lowered.

Figure 6:
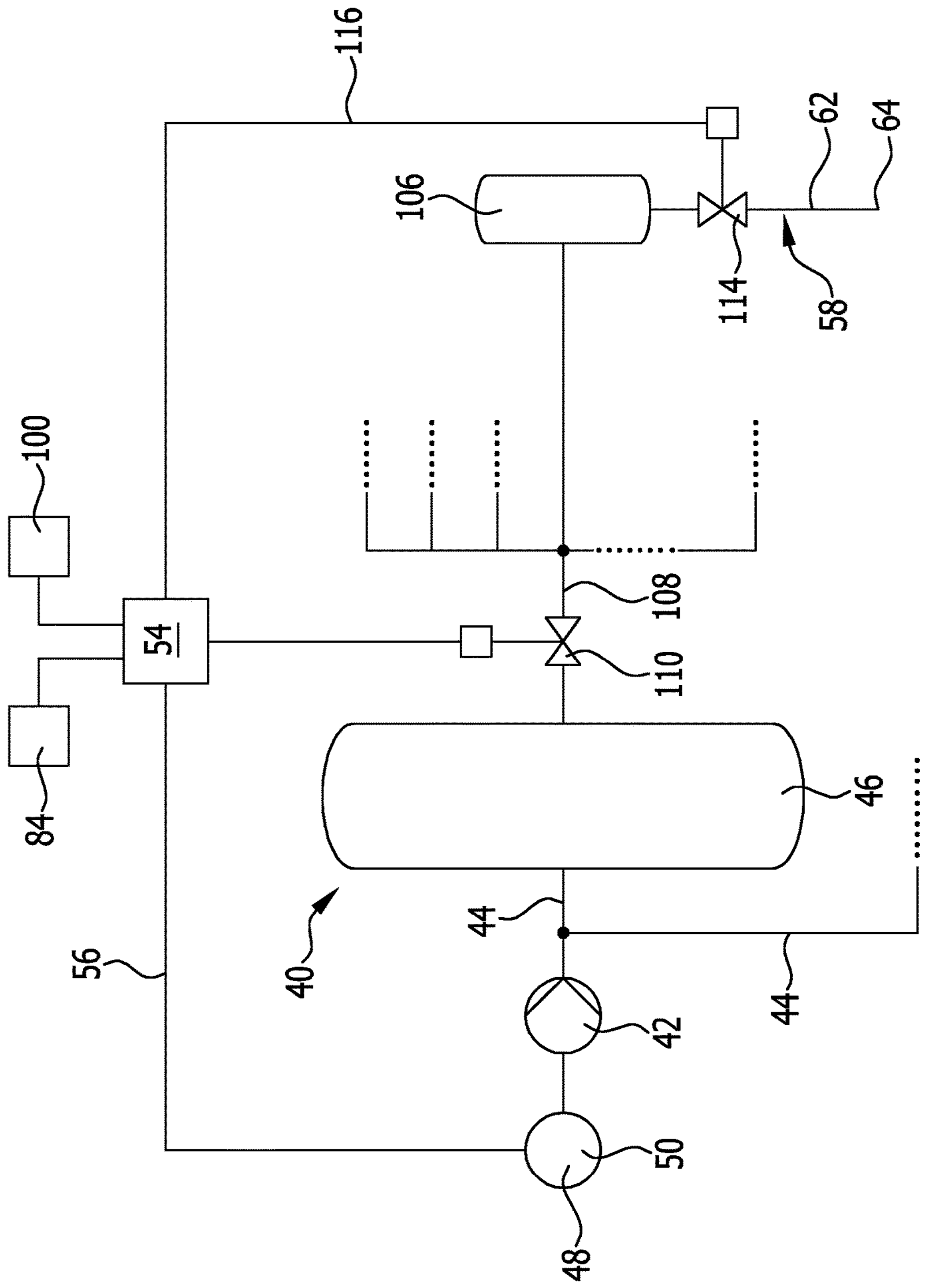
FIG. 6: shows a schematic, simplified circuit diagram of the ground treatment apparatus.

The control of the adjustment device 84 and the lifting device 100 by the control device 54 is schematically depicted in FIG. 6 and occurs, for example, in that the latter operates valves, not depicted in the illustration, in the hydraulic conduits 88, 104 or further, not depicted hydraulic conduits, in such a way that the piston-cylinder-assemblies 86, 102 are optionally acted upon with hydraulic liquid or hydraulic liquid is removed therefrom.

The reservoirs 46 are held on the holding device 60. The reservoirs 46 are thereby fixed in particular on the upper transverse support 74 on both sides of the piston-cylinder-assembly 86.

The compressed air reserved in the reservoirs 46 is temporarily stored prior to the injection into the ground 12. To this end, the apparatus 10 has a plurality of fluid containers 106. In accordance with the invention, associated with each fluid container 106 is at least one of the injection elements 58 which is in optionally releasable or blockable fluidic connection with the respective fluid container 106.

In the advantageous embodiment of the apparatus 10 in accordance with the invention, provision is even made for the number of the fluid containers 106 to be equal to the number of the injection elements 58. An injection element 58 is associated with each fluid container 106, wherein conversely a fluid container 106 is associated with each fluid element 58. The respective fluid container 106 is in fluidic connection with one of the injection elements 58.

The apparatus 10 presently comprises 26 injection elements 58 which are grouped in four rows, located one behind the other along the working direction 38, of six/seven/six/seven injection elements. Adjacent rows of injection elements have are staggered to each other, such that the injection elements 58 are positioned according to a hexagonal pattern defined by the same and are spaced uniformly apart from each other. The respective spacing is about 25 cm.

Each reservoir 46 is in fluidic connection with half of the fluid containers 106 and, accordingly, with 13 fluid containers 106. To this end, the fluid providing device 40 has branching filling conduits 108, wherein on the exit side of a reservoir 46, a filling valve 110 is connected before the respective branching of the filling conduit 108 into 13 individual conduits. The filling valve 110 is controllable by the control device 54, such that the filling conduits 108 may be optionally released or blocked. FIG. 6 schematically shows the connection of a fluid container 106, wherein a filling conduit 108 is shown in sections in FIGS. 5 and 6.

The mounting of the injection elements 58 and the fluid containers 106 on the holding device 60 will be subsequently described with reference to FIGS. 4 and 5. Due to identical configuration, only one respective instance will be described, which is depicted in FIG. 5 together with other components of the respective injection unit 118.

As mentioned, there is a fluidic connection between the fluid container 106 and the injection element 58. Presently, the fluidic connection is formed in that a valve housing 112 of an outlet valve 114 is connected to the fluid container 106 on the exit side. Conversely, the fluid container 106 is connected to the entry side of the valve housing 112. The filling conduit 108 is connected to the fluid container 106 on a side opposite the outlet valve 114. The pipe conduit 62 of the injection element 58 is connected to the exit side of the valve housing 112.

The fluid container 106 is thereby connected to the nozzle 64 in linear direction. The connection of the fluid container 106, the outlet valve 114, and the injection element 58 is rigid. Compressed air may flow linearly from the fluid container 106 to the nozzle 64 when the outlet valve 114 is opened. In particular, no redirections for redirecting the compressed air and no hose conduits for forming the fluidic connection from the fluid container 106 to the injection element 58 are provided.

The formation of a linear flow of the fluidic connection from the fluid container 106 to the nozzle 64 and the rigid structure enables, this is proven in practice, a rapid and advantageous pressure buildup when the outlet valve 114 is opened. The pressure is not transferred into possible deformation work, e.g. for deforming hose conduits. Instead, it is ensured that the amount of compressed air stored in the fluid container 106 is able to be used for effective airification of the ground 12.

The outlet valve 114 is connected to the control device 54 by a control line 116, such that the fluidic connection from the fluid container 106 to the injection element 58 may be optionally released and blocked.

The injection element 58, the outlet valve 114, and the fluid container 106 preferably form a preassembled injection unit 118 of the apparatus 10 in order to facilitate its assembly. In the case of a defective injection unit 118, the same may further be removed from the apparatus 10 in a user-friendly manner and replaced with an undamaged injection unit 118.

The injection units 118 are of identical configuration.

For mounting an injection unit 118, the apparatus 10 comprises a fixing part 120 which may likewise be a constituent of the injection unit 118. The fixing part 120 has a fixing region 122 and a supporting region 124.

Formed in the plate 96 is a respective through-opening 126 in the form of a perforation for an injection unit 118. This is depicted schematically and simplified in FIG. 5, wherein a dashed arrow 128 symbolizes how the injection unit 118, leading with the injection element 58, may be passed in part through the through-opening 126. The through-opening 126 is enclosed by a rim 130.

The fixing region 122 is of flange-like configuration and is fixed e.g. by screw connection on the rim 130 of the through-opening 126. The pipe conduit 62 and the supporting region 124 pass through the through-opening and are positioned beneath the holding body 94, whereas the fixing region 122 is arranged on the upper side of the holding body 94. The outlet valve 114 and the fluid container 106 are positioned above the holding body 94 (FIGS. 4 and 5).

The fixing region 122 has a support member 132 which is passed through by the pipe conduit 62 and serves as a guide for the same. Supported on the support member 132 is a restoring element 134 which is configured as a coil spring 136. The end of the coil spring 136 opposite the support member 132 is supported on a support member 138 fixed on the pipe conduit 62, for which support member 138 in turn the supporting region 124 serves as a stop. The coil spring 136 is thereby biased between the presently annular shoulder-like support members 132, 138, and it may act upon the injection element 58 with a force pointing away from the holding body 94 if the injection element 58 is displaced. The force is a restoring and in particular biasing force.

When lowering the holding device 60, it is conceivable that the injection element 58 contacts e.g. a rock in the ground 12 or even a pipe conduit 22. Counter to the restoring force of the coil spring 136, the injection element 58 can be displaced relative to the holding body 94 to protect it from damage. The outlet valve 114 and the fluid container 106 are thereby also displaced. This is advantageous because no moveable sealing faces need to be provided at the connections of the valve housing 112. By way of the rigid connection of the injection element 58, the outlet valve 114, and the fluid container 106, a long-lasting tightness of the fluidic connection may be ensured.

If a force on the injection element 58 in the direction to the holding body 94 is no longer present, the restoring force of the coil spring 136 provides for a restoration of the injection element 58 with outlet valve 114 and fluid container 106 held thereon into the initial position.

Upon displacement of the injection element 58, beyond the support member 132, a guide member 140 serves for guidance. The guide member 140 is formed by the supporting region 124. The supporting region 124 has in its basic shape a roughly truncated pyramid shaped contour.

The holding part 70 comprises an abutment body 142 which is arranged beneath the holding body 94 and is positioned at a distance therefrom. The holding body 142 is presently configured as a plate 144. Supporting parts 146 serve to support the abutment body 142 on the holding body 94. The supporting parts 146 are configured e.g. similar to struts which may run transverse to the working direction 38 and are trapezoidal in cross section.

Moreover, the abutment body 142 is held on the vertical supports 92 of the frame 90. The supporting parts 146 and the supporting regions 124 as well as the coil springs 136 are arranged in an intermediate space between the holding body 94 and the abutment body 142.

The pipe conduits 62 pass through the abutment body 142, such that the nozzles 64 are arranged beneath the same. A sealing element 148 is arranged on the abutment body 142 on the bottom side. The sealing element 148 runs e.g. along an outer rim of the abutment body 142 and encloses the pipe conduits 62 passing through the abutment body 142. The sealing element 148 is preferably a compressible sealing bead.

When the holding device 60 is lowered and the injection elements 58 engage into the ground 12, the abutment body 142 is supported on the ground surface 16. The emergence of unevenness of the ground surface 16 as a result of the compressed air injection is thereby avoided. The sealing element 148 ensures that no fluid escapes between the ground surface 16 and the abutment body 142. Instead, the compressed air spreads within the ground to loosen the soil 14.

As mentioned above, provision may be made for the holding part 70 to be slightly raised with the injection elements 58 before the injection, wherein a sealing by way of the sealing element 148 may be achieved.

The apparatus 10 is moved in the working direction 38 in operation. The control device 54 controls the adjustment device 84 and the lifting device 100 as explained above, such that processing regions on the ground 12 located successively one behind the other in the working direction 38 may be covered. A quasi-continuous processing of the ground 12 is possible by lowering the holding part 70, the holding device 60 remaining stationary on the ground 12 while moving relative to the support device 24, raising the holding part 70, and displacing the holding device 60 in the working direction 38.

The control device 54 further controls the filling valves 110 and the outlet valves 114. After lowering the holding part 70 onto the ground surface 16, such that the injection elements 58 engage into the ground 12, the control device 54 actuates the outlet valves 114 to release the fluidic connection from the fluid containers 106 to the injection elements 58. The compressed air is injected into the ground 12. Preferably one single pressure pulse occurs, wherein the opening time of the outlet valves 144 is about 0.1 s. The air pressure in the fluid containers 106 is about 7 bar, the volume of the fluid containers 106 about 1 L.

Upon the compressed air injection, the fluid containers 106 are not emptied, a residual volume of compressed air having overpressure in relation to the environment remains. With respect to the outer pressure in the ground 12, the compressed air amount that is injected into the ground 12 is about 2 L to 4 L.

During the compressed air injection, the filling conduits 108 are blocked by means of the filling valves 110. After the compressed air injection, the outlet valves 114 block the fluidic connection and the control device 54 actuates the filling valves 110. The filling conduits 108 are thereby released, such that the fluid containers 106 may be refilled with compressed air from the reservoirs 46. Then, the filling valves 110 are closed and a new injection operation may be carried out, with the holding part 70 lowered once again.

REFERENCE NUMERAL LIST

10 ground treatment apparatus
12 ground
14 soil
16 ground surface
18 grass growth
20 grass conditioning device
22 pipe conduit
24 support device
26 support frame
28 side wall
30 front side
32 coupling device
34 rear side
36 roller
38 working direction
40 fluid providing device
42 conveying assembly
44 supply conduit
46 reservoir
48 drive
50 hydraulic pump
52 shaft
54 control device
56 control line
58 injection element
60 holding device
62 pipe conduit
64 nozzle
66 nozzle
68 coupling part
70 holding part
72 frame
74 upper transverse support
76 vertical support
78 frame
80 wheels
82 guide
84 adjustment device
86 piston-cylinder-assembly
88 hydraulic conduit
90 frame
92 vertical support
94 holding body
96 plate
98 frame
100 lifting device
102 piston-cylinder-assembly
104 hydraulic conduit
106 fluid container
108 filling conduit
110 filling valve
112 valve housing
114 outlet valve
116 control line
118 injection unit
120 fixing part
122 fixing region
124 supporting region
126 through-opening
128 arrow
130 rim
132 support member
134 restoring element
136 coil spring
138 support member
140 guide member
142 abutment body
144 plate
146 supporting part
148 sealing element

The invention claimed is:

1. A ground treatment apparatus for loosening ground, the ground treatment apparatus comprising:
- a support device;
- a holding device held on the support device;
- a plurality of injection elements disposed on the holding device;
- a fluid providing device in fluidic connection with the plurality of injection elements;
- a lifting device adapted to insert the plurality of injection elements into the ground and to extract the plurality of injection elements from the ground;
- a plurality of fluid containers in fluidic connection with the fluid providing device for the supply of fluid; and
- a valve device having a plurality of outlet valves;
- wherein:
- the ground treatment apparatus comprises preassembled injection units, a respective injection unit comprising a fluid container, an outlet valve and an injection element,
- a respective outlet valve comprising a valve housing having an entry side and an exit side, with the respective fluid container being connected to the entry side and the respective injection element being connected to the exit side to provide a fluidic connection between the respective fluid container and the respective injection element,
- the fluidic connection being selectively releasable or blockable by means of the respective outlet valve,
- with the fluid container, the outlet valve, and the injection element of the respective injection unit being rigidly connected to each other;
- and wherein the ground treatment apparatus comprises a control device adapted to control the plurality of outlet valves to release the respective fluidic connection when the plurality of injection elements are inserted into the ground.

2. The ground treatment apparatus in accordance with claim 1, wherein the plurality of injection elements are or comprise pipe conduits with nozzles arranged on a respective end of a pipe conduit.

3. The ground treatment apparatus in accordance with claim 1, wherein a respective fluid container is connected in a linear direction to a nozzle located at an end of the respective injection element.

4. The ground treatment apparatus in accordance with claim 1, wherein the ground treatment apparatus is devoid of hose conduits for connecting a respective fluid container to a respective injection element.

5. The ground treatment apparatus in accordance with claim 1, wherein the fluid providing device comprises at least one reservoir as well as a conveying assembly adapted to convey fluid into the at least one reservoir, the at least one reservoir being in fluidic connection with the plurality of fluid containers by way of at least one filling conduit, the valve device comprising at least one filling valve with which the at least one filling conduit is selectively releasable and blockable.

6. The ground treatment apparatus in accordance with claim 5, wherein the control device is adapted to control the at least one filling valve, wherein the control device controls the at least one filling valve to block the at least one filling conduit when the plurality of outlet valves release the fluidic connection from the plurality of fluid containers to the plurality of injection elements, and wherein the control device controls the at least one filling valve to at least temporarily release the at least one filling conduit and act upon the plurality of fluid containers with fluid when the plurality of outlet valves block the fluidic connection from the plurality of fluid containers to the plurality of injection elements.

7. The ground treatment apparatus in accordance with claim 1, wherein the fluid is a gas or gas mixture.

8. The ground treatment apparatus in accordance with claim 1, wherein the holding device has a coupling part and a holding part, wherein the holding device is held on the support device by the coupling part and the plurality of injection elements are held on the holding part.

9. The ground treatment apparatus in accordance with claim 8, wherein the ground treatment apparatus comprises an adjustment device by way of which the coupling part is moveable relative to the support device along a working direction of the ground treatment apparatus.

10. The ground treatment apparatus in accordance with claim 8, wherein the lifting device is adapted to raise and lower the holding part relative to the coupling part.

11. The ground treatment apparatus in accordance with claim 8, wherein at least one of the adjustment device and the lifting device is of hydraulic configuration, and wherein the ground treatment apparatus comprises a hydraulic pump for providing hydraulic liquid for at least one of the adjustment device and the lifting device, or wherein at least one of the adjustment device and the lifting device is of pneumatic, mechanical or electrical configuration.

12. The ground treatment apparatus in accordance with claim 1, wherein the holding device has a holding body on which the plurality of injection elements are fixed by means of fixing parts, with the plurality of outlet valves and the plurality of fluid containers being arranged above the holding body.

13. The ground treatment apparatus in accordance with claim 12, wherein the plurality of injection elements pass through through-openings of the holding body, wherein a respective injection element is fixed with a fixing part on a rim of a respective through-opening.

14. The ground treatment apparatus in accordance with claim 12, wherein the ground treatment apparatus comprises a plurality of restoring elements, a respective injection element being displaceable relative to the holding body counter to the restoring force of a respective restoring elements acting upon the injection element in a direction away from the holding body, wherein a respective-fixing part forms a guide for the respective injection elements.

15. The ground treatment apparatus in accordance with claim 14, wherein the respective-fluid container and the respective outlet valve of an injection unit are displaceable together with the respective injection element.

16. The ground treatment apparatus in accordance with claim 12, wherein the respective injection unit comprises a fixing part.

17. The ground treatment apparatus in accordance with claim 1, wherein the ground treatment apparatus comprises at least one abutment body for abutment on the ground surface, wherein a respective injection element passes through an abutment body, and wherein the at least one abutment body comprises at least one sealing element, or at least one a sealing element is arranged on the abutment body, which encloses the respective injection element.

18. The ground treatment apparatus in accordance with claim 17, wherein the plurality of injection elements pass through the abutment body, and wherein sealing element encloses the plurality of injection elements.

19. The ground treatment apparatus in accordance with claim 17, wherein the at least one abutment body is positioned at a distance from a holding body of the holding part and is supported on the holding body by supporting parts, wherein the plurality of injection elements pass through an intermediate space between the at least one abutment body and the holding body.

20. The ground apparatus in accordance with claim 19, wherein at least one of the holding body and the at least one abutment body is configured to be plate-shaped, at least in sections.

21. The ground treatment apparatus in accordance with claim 1, wherein the control device controls the plurality of outlet valves according to at least one of the following:

executing only one fluid pulse through the plurality of injection elements;

releasing the fluidic connection for about 0.05 s to 0.5 s.

22. The ground treatment apparatus in accordance with claim 1, wherein the respective fluid container has a volume of about 0.25 L to 2 L.

23. The ground treatment apparatus in accordance with claim 1, wherein the fluid providing device is configured in such a way that a fluid pressure of about 5 bar to 10 bar is providable in the plurality of fluid containers.

24. The ground treatment apparatus in accordance with claim 1, wherein the ground treatment apparatus comprises a coupling device for connecting to a traction vehicle.

25. The ground treatment apparatus in accordance with claim 1, wherein the ground treatment apparatus is configured to be self-propelled and self-steering.

* * * * *